United States Patent [19]

Leonard et al.

[11] Patent Number: 5,326,639
[45] Date of Patent: Jul. 5, 1994

[54] THERMOPLASTIC OLEFIN POLYMER AND METHOD OF PREPARING SAME

[75] Inventors: Lewis R. Leonard, Ingham County, Mich.; Anteo Pelliconi, Rovigo, Italy; Giuliano Cecchin; Giovanni Patroncini, both of Ferrara, Italy

[73] Assignee: Himont Incorporated, Wilmington, Del.

[21] Appl. No.: 73,631

[22] Filed: Jun. 8, 1993

Related U.S. Application Data

[63] Continuation of Ser. No. 542,468, Jun. 22, 1990, abandoned, which is a continuation-in-part of Ser. No. 397,616, Aug. 23, 1989, abandoned.

[51] Int. Cl.$^5$ .................. C08L 23/16; C08L 23/20; C08L 23/04
[52] U.S. Cl. .................... 428/402; 525/322; 525/323; 525/240; 526/909
[58] Field of Search ............ 525/322, 323, 324, 240; 428/402

[56] References Cited

U.S. PATENT DOCUMENTS

| | | | |
|---|---|---|---|
| 3,036,987 | 5/1962 | Ranalli | 260/45.5 |
| 3,835,201 | 9/1974 | Flecher | 260/45.7 |
| 4,113,802 | 9/1978 | Matteoli et al. | 260/878 |
| 4,128,606 | 12/1978 | Furutachi et al. | 525/322 |
| 4,316,966 | 2/1982 | Mineshima et al. | 525/240 |
| 4,368,280 | 1/1983 | Yui et al. | 525/240 |
| 4,473,687 | 9/1984 | Dorrer et al. | 525/322 |
| 4,489,195 | 12/1984 | Saeda et al. | 525/323 |
| 4,491,682 | 1/1985 | Matthews et al. | 525/247 |
| 4,521,566 | 1/1985 | Galli et al. | 525/322 |
| 4,547,552 | 10/1985 | Toyota et al. | 525/323 |
| 4,634,735 | 1/1987 | Thiersault et al. | 525/240 |
| 4,734,459 | 3/1988 | Cecchin et al. | 525/247 |
| 4,748,206 | 5/1988 | Nogiwa et al. | 525/88 |
| 4,764,404 | 8/1988 | Genske et al. | 428/463 |
| 5,006,600 | 4/1991 | Buechner et al. | 525/323 |
| 5,212,246 | 5/1993 | Ogale | 525/322 |

FOREIGN PATENT DOCUMENTS

| | | |
|---|---|---|
| 1877288 | 1/1989 | Australia . |
| 2569688 | 5/1989 | Australia . |
| 0145368 | 6/1985 | European Pat. Off. . |
| 0400333 | 12/1990 | European Pat. Off. . |
| 58-101135-A | 6/1983 | Japan . |
| 61-098756 | 5/1986 | Japan . |

*Primary Examiner*—Carman J. Seccuro, Jr.

[57] ABSTRACT

Disclosed is a thermoplastic olefin polymer having elastic properties comprising
a) greater than 60 to 85 parts of a crystalline polymer fraction selected from the group consisting of (i) a copolymer of propylene and at least one alpha-olefin, (ii) a polybutene-1, (iii) an ethylene homopolymer or ethylene/alpha-olefin copolymer, (iv) polymer fraction (i), (ii) or (iii) in combination with, or mixtures thereof alone or in combination with, from 10 to 90 parts, based on the thermoplastic olefin polymer, of a homopolymer of propylene;
b) from about 1 up to less than 15 parts of a semi-crystalline, low density, essentially linear copolymer fraction consisting substantially of units of the alpha-olefin used to prepare c) or the alpha-olefin used to prepare c) present in the greatest amount when two alpha-olefins are used; and
c) from about 10 to less than 39 parts of an amorphous copolymer fraction of an alpha-olefin and propylene, with or without a diene or a different alpha-olefin termonomer.

16 Claims, No Drawings

THERMOPLASTIC OLEFIN POLYMER AND METHOD OF PREPARING SAME

This application is a continuation of application Ser. No. 07/542,468, filed Jun. 22, 1990, now abandoned, which is continuation-in-part of Ser. No. 07/397,616, filed Aug. 23, 1989, now abandoned.

FIELD OF THE INVENTION

This invention relates ho thermoplastic olefin polymers having elastic properties, and to a method for preparing same. More particularly this invention relates to thermoplastic olefin polymers which have an excellent balance of several properties, such as flexibility, tensile strength, impact strength, tear strength and elongation.

BACKGROUND OF THE INVENTION

Thermoplastic olefin polymers prepared by physically blending or mixing monoolefin copolymer or terpolymer rubbers and polyolefins are known (see, e.g. U.S. Pat. Nos. 3,036,987, 3,835,201 and 4,748,206). However, in order to achieve a good dispersion of the rubber in the polyolefin it is necessary to employ energy intensive mixing.

The formation of thermoplastic elastomers (TPE) from such blends is also known. Although there are a number of methods taught, the one generally practiced is dynamic vulcanization of such blends, such as by the method described in U.S. Pat. No. 3,806,558.

In order to avoid the disadvantages associated with physical blending while at the same time avoid the necessity to dynamically vulcanize such blends, efforts have been made to produce reactor or chemical blends of a crystalline polypropylene and an amorphous ethylene-propylene copolymer rubber by sequential polymerization in a reactor.

In U.S. Pat. No. 4,489,195, for example, the preparation of polyolefin thermoplastic elastomers by a two-stage polymerization process using stereospecific catalysts composed of an organoaluminum compound and a solid catalyst component on a magnesium halide support is taught. In the first stage 5-50 wt. % of a homopolymer of propylene is formed, and in the second, 50-95% of an ethylene-propylene copolymer having a propylene content of 5-60% is prepared by adding ethylene monomer which reacts with the unreacted propylene monomer of the first stage. The polypropylene produced in the first stage and the ethylene-propylene rubber of the second stage are believed to be chemically combined so as to form a block copolymer. One of the disadvantages of this method is that the temperature in the second stage must be kept relatively low, i.e. not more than 50° C., in order to prevent agglomeration of the ethylene-copolymer rubber particles and reactor fouling. This need to operate the second stage at relatively low temperatures penalizes the process with respect to heat exchange and diminishes catalyst mileage.

U.S. Pat. No. 4,491,652 also describes the preparation of polypropylene thermoplastic elastomers in two stages. In the first stage the propylene is polymerized to a homopolymer polypropylene. In the second stage, ethylene is added and ethylene and propylene are polymerized in the presence of a solvent, preferably at temperatures of 60°–77° C., to form rubbery copolymers and block copolymers of the polypropylene and ethylene/propylene rubbery copolymer. The polymerizations conditions employed in the second stage leads to the formation of a partially soluble rubbery copolymer which tends to cause the resultant product to lump or agglomerate. These lumps or agglomerates must be broken up to provide a homogeneous product. Typically this is done by grinding on a mill. As a matter of fact, it is known that when over 20%, based on the thermoplastic elastomer, of the rubbery ethylene/propylene copolymer is produced during the preparation of the thermoplastic elastomer, it is impossible to avoid agglomeration of the particles even when the polymerization takes place in the presence of stereospecific catalysts (see, e.g., European application 0029651 and U.S. Pat. No. 4,259,461).

Polymerization of such rubbery copolymers in a gas process, even in small amounts of 20% or more, likewise leads to product agglomeration and fouling of the reactors. This reactor fouling effectively prevents one from conducting such a polymerization process in gas phase.

Therefore, it is necessary to be able to produce a thermoplastic olefin polymer having the desired balance of mechanical properties in a reactor or sequence of reactors, including, where desirable, at least one gas phase reactor, which avoids the disadvantages associated with the present methods of producing this type of polymer.

SUMMARY OF THE INVENTION

The present invention provides a thermoplastic olefin polymer comprising a) greater than 60 to about 85 parts of a crystalline polymer fraction selected from the group consisting of (i) a copolymer of propylene and at least one alpha-olefin having the formula $H_2C=CHR$, where R is H or a $C_{2-6}$ straight or branched chain alkyl, containing over 85% by weight of propylene and having an isotacticity index of greater than 75, (ii) a polybutene-1 having an isotacticity index of greater than 75, (iii) an ethylene homopolymer having a density of 0.95 g/cm$^3$ or greater, or a copolymer of ethylene with a $C_{3-8}$ alpha-olefin having a density of 0.915 g/cm$^3$ or greater, (iv) polymer fraction (i), (ii) or (iii) in combination with, or mixtures thereof alone or in combination with, from 10 to 90 parts, based on the thermoplastic olefin polymer, of a homopolymer of propylene having an isotacticity index of greater than 85;

b) from about 1 up to less than 15 parts of a semi-crystalline, low density, essentially linear copolymer fraction consisting substantially of units of the alpha-olefin used to prepare c) or the alpha-olefin used to prepare c) which is present in the greatest amount when two alpha-olefins are used, which polymer is insoluble in xylene at room temperature; and c) from about 10 to less than 39 parts of an amorphous copolymer fraction of an alpha-olefin having the above formula and propylene, with or without 1 to 10% of a diene or 1 to 20% of a different alpha-olefin termonomer having the above formula, which copolymer contains from about 30 to about 80 weight % alpha-olefin, excluding the alpha-olefin present, if any, as a termonomer, and is soluble in xylene at room temperature, having a flexural modulus lower than 1000 MPa to 150 MPa, tensile strength greater than 7 MPa, impact strength such that it breaks with a ductile impact failure at −18° C. and an elongation at break over 200%, wherein the total of components a), b) and c) is 100 parts.

This invention further provides a method of producing such thermoplastic olefin polymers by sequential polymerization in at least two stages in a reactor or two or more reactors, one or more of which may be gas phase reactor, using certain catalysts supported on an activated magnesium dichloride.

DETAILED DESCRIPTION OF THE INVENTION

Unless otherwise indicated, all parts and percentages set forth herein are by weight.

Component a) is preferably present in an amount from 65 to about 75 parts.

Component a) (i) is typically a copolymer of propylene and at least one alpha-olefin having the formula set forth herein above, such as propylene/ethylene, propylene/-butene-1 and propylene/4-methyl-pentene-1, or a terpolymer of propylene and two different alpha-olefins, such as propylene/ethylene/butene-1, propylene/butene-1/4-methylpentene-1 and propylene/ethylene/4-methylpentene-1.

The crystalline propylene copolymer of component a) (i) preferably contains from 90 to 98 wt. % propylene, most preferably from 95 to 98 wt. % propylene.

The preferred isotacticity index of component a) (i) and (ii) is greater than 85 with the most preferred being greater than 90.

Typically when component a) (iii) is a copolymer of ethylene with a $C_{3-8}$ alpha-olefin, the alpha-olefin is present in an amount from about 1 to 10%. Suitable ethylene copolymers useful as component a) (iii) include ethylene/butene-1, ethylene/hexene-1 and ethylene/4-methyl-1-pentene. The copolymer can be a HDPE or a LLDPE, preferably an HDPE. Most preferably the density of the ethylene copolymer is 0.94 $g/cm^3$ or greater.

Preferably component a) is a propylene/ethylene copolymer, propylene/butene-1 copolymer or propylene/ethylene/butene-1 terpolymer.

When component a) (i), (ii) or (iii) or mixtures thereof are combined with a homopolymer of propylene, it is preferably present in an amount from 30 to 70 parts, most preferably 40 to 60 parts.

Component b) is preferably present in an amount from about 3 to less than 15, most preferably from about 5 to less than 10. Typically the crystallinity is about 20 to about 60% by differential scanning calorimetry.

Component c) is preferably present in an amount from about 10 to less than 30, most preferably from about 20 to less than 30.

The alpha-olefin in the copolymer of component c) is preferably present in an amount from about 40 to about 75%, and in component b) it is usually over 90%, more typically greater than 95%. When component c) is a terpolymer, the alpha-olefin employed as a termonomer is preferably present in an amount from about 3 to about 10 wt. %.

Typical dienes useful in the preparation of component c) are 1,4-hexadiene, 1,5-hexadiene, dicyclopentadiene, ethylidene norbornene, 1,6-octadiene and vinyl norbornene. Ethylidene norbornene is preferred.

Component c) is preferably an amorphous ethylene/-propylene copolymer, ethylene/propylene/diene monomer terpolymer or ethylene/propylene/butene-1 terpolymer. Suitable alpha-olefins useful in the preparation of the various components of the thermoplastic olefin polymers of this invention include ethylene, butene-1, pentene-1, 4-methylpentene-1, hexene-1 and octene-1. Ethylene and butene-1 are preferred.

The resultant thermoplastic olefin polymer has a high bulk density and is in the form of free flowing spherical particles having an average diameter from 250 and 7000 microns, preferably from 500 to 7000 microns. Hence, post-polymerization granulation or grinding is not required before the polymer can be further processed, converted or fabricated. The flowability of the polymer particles at 70° C. is lower than 30 seconds and the bulk density (compacted) is greater than 0.4 g/cc, preferably greater than 0.4 to about 0.6 g/cc.

The total content of the polymerized alpha-olefin in the thermoplastic olefin polymer of this invention, excluding the alpha-olefin present, if any, as a termonomer when component c) is a terpolymer, is from 10 to 30, preferably from 15 and 25% by weight.

The molecular weight of the various components (determined by measuring intrinsic viscosity in tetrahydronaphthalene at 135° C.) varies depending on the nature of the components and the melt index of the final product. Generally it is within the following preferred limits: preferably from 0.5 to about 3 dl/g for component a) and from 1 to about 3 dl/g for components b) and c).

The thermoplastic olefin polymers of the present invention have one major melting peak determined by DSC at higher than 115° C., preferably higher than 135° C., most preferably higher than 140° C.; flexural modulus lower than 1000 MPa to 150 MPa, preferably from 150 to 700 MPa, most preferably from 500 to 700 MPa; elongation at break over 200%, preferably over 500% tensile at break greater than 7 MPa, preferably greater than 10 MPa, most preferably greater than 13 MPa; and an impact strength such that it preferably breaks with a ductile impact failure at −29° C.

The polymers of this invention can be used to manufacture parts, components and materials useful in the automotive industry, such as automotive interior trim and bumpers, and in the industrial consumer market, including the medical, furniture, appliance, building-/construction and recreational/sports industries.

The compositions are prepared by a polymerization process including at least two stages. In the first stage the relevant monomers or monomers are polymerized to form component a), and in the following stages the relevant monomers are polymerized to form components b) and c).

The polymerization reactions can be done in liquid or gas phase processes, or in a combination of liquid and gas phase processes using separate reactors, all of which can be done either by batch or continuously.

The preferred method of preparing the thermoplastic olefin polymer of this invention is a two stage process comprising the polymerization of component a) in liquid phase in the presence of a liquid monomer, and the polymerization of component b) and c) in gas phase.

The polymerization reactions are carried out in an inert atmosphere in the presence of an inert hydrocarbon solvent or of a liquid or gaseous monomer.

Hydrogen can be added as needed as a chain transfer agent for control of the molecular weight.

The typical reaction temperature used in the polymerization of component a) and in the polymerization of components b) and c) may be the same or different. Generally the reaction temperature employed for the polymerization of component a) is from about 40° C. to about 90° C., preferably from about 50° C. to about 80° C. Components b) and c) are typically polymerized at a temperature from about 50° C. to about 80° C., preferably about 65° C. to 80° C.

The reactions can be conducted at a pressure from about atmospheric to about 1000 psi, preferably from about 150 to 600 psi in liquid phase polymerization and from atmospheric to 30 atmospheres, preferably from 5 to 30 atmospheres, in gas phase polymerization. Typical residence times are from about 30 minutes to about 8 hours.

Suitable inert hydrocarbons solvents include saturated hydrocarbons such as propane, butane, hexane and heptane.

The catalyst system used in the polymerization comprises the reaction product of 1) a solid catalyst component containing a titanium compound and an electron-donor compound supported on activated magnesium dichloride, 2) a trialkylaluminum compound as activator and 3) an electron-donor compound.

Suitable titanium compound include those with at least one Ti-halogen bond, such as halides and halogen alcoholates of titanium.

In order to obtain the thermoplastic olefin polymers of this invention in the form of flowable spherical particles having a high bulk density, it is essential that the solid catalyst component have a) a surface area smaller than 100 m$^2$/g, preferably between 50 and 80 m$_2$/g, b) a porosity from 0.25 to 0.4 cc/g. and c) an X-ray spectrum, where the magnesium chloride refections appear, by the presence of a halo between the angles 2 $\theta$ of 33.5° and 35° and by the absence of the reflection at 2 $\theta$ of 14.95°. The symbol $\theta$ = Bragg angle.

The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 100° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl$_4$ is 40–50 g/l TiCl$_4$. The mixture is then heated to a temperature of 80° C. to 135° C. for a period of about 1–2 hr. When the temperature reaches 40° C., sufficient electron donor is added so that the molar ratio of Mg to electron donor is 8. When the heat treatment period has ended, the excess hot TiCl$_4$ is separated by filtration or sedimentation, and the treatment with TiCl$_4$ is repeated one or more times. The solid is then washed with a suitable inert hydrocarbon compound and dried.

The solid catalyst component typically has the following characteristics:

| | |
|---|---|
| surface area: | less than 100 m$^2$/g, preferably between 50 and 80 m$^2$/g |
| porosity: | 0.25–0.4 cc/g |
| pore volume distribution: | 50 of the pores have a radius greater than 100 angströoms. |
| X-ray spectrum: | where the Mg chloride refections appear, showing a halo with maximum intensity between angles of 2$\theta$ of 33.5° and 35°, and where the reflection at 2$\theta$ of 14.95° is absent. |

Suitable electron-donor compounds for use in preparing the solid catalyst component include alkyl, cycloalkyl or aryl phthalates, such as diisobutylphthalate, di-n-butylphthalate and di-n-octylphthalate.

Hexane and heptane are typical hydrocarbon compounds used to wash the solid catalyst component.

The catalyst is obtained by mixing the solid catalyst component with a trialkyl aluminum compound, preferably triethyl aluminum and triisobutyl aluminum, and an electron-donor compound.

Various electron donor compunds are known in the art. The preferred electron donor compounds are those silane compounds having the formula R'R"Si(OR)$_2$ where R' and R" may be the same or different and are alkyl, cycloalkyl, or 1–18 carbon aryl radicals, and R is a 1–4 carbon alkyl radical.

Typical silane compounds which may be used include diphenyldimethoxysilane, dicyclohexyldimethoxysilane, methyl-t-butyldimethoxysilane, diisopropyldimethoxysilane and phenyltrimethoxysilane.

The Al/Ti ratio is typically between 10 and 200 and the Al/silane ratio between 2 and 100, preferably 5 and 50.

The catalysts may be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The content and amount of catalyst residue in the thermoplastic olefin polymers of this invention is sufficiently small so as to make the removal of catalyst residue, typically referred to as deashing, unnecessary.

ANALYTICAL METHODS

Unless otherwise specified, the following analytical methods were used to characterize the supported catalyst component, the thermoplastic olefin polymer samples of this invention and comparative samples.

| Properties | Method |
|---|---|
| Melt Flow Index, g/10 min. | ASTM-D 1238 |
| Ethylene, wt % | Spectroscopy I.R. |
| Intrinsic viscosity | Determined in tetrahydronaphthalene at 135° C. |
| Xylene solubles, wt % | See description below. |
| Flexural modulus | ASTM-D 790 |
| Notched IZOD impact | ASTM-D 256 |
| VICAT (1 Kg) softening pt. | ASTM-D 1525 |
| Tensile Strength | ASTM-D 638 |
| Elongation at break | ASTM-D 638 |
| Surface area | B. E. T. |
| Porosity | B. E. T. |
| Bulk density | DIN-53194 |
| Fluidity | The time that it takes 100 g of polymer to flow through a funnel with an output opening of 1.27 cm and walls inclined at an angle of 20° with respect to the vertical. |
| Granulometry | ASTM-D 1921-63 |

The physical tests are conducted on pelletized samples of this invention, which were stabilized with 500 ppm of calcium stearate, 500 ppm of paraffinic oil, 350 ppm of tetrakis(2,4-di-t-butylphenyl) 4,4'-biphenylylenediphosphonite, 500 ppm tetrakis[methylene(3,5-di-t-butyl-4-hydroxyhydrocinnamate)] methane and 250 ppm octadecyl 3,5-di-t-butyl-4-hydroxyhydrocinnamate. The samples were molded using a Negri & Bossi 90 injection press with a melt temperature of 190° C., a mold temperature of 60° C., an injection time 20 seconds and a cooling time of 25 seconds.

The percent by weight of components b) and c) is calculated by determining the weight of the propylene and alpha-olefin (and diene or different alpha-olefin termonomer if used) mixture used in the second stage and comparing it to the weight of the final product.

The weight percent of component a) is determined by subtracting the weight percents of component b) and c) from 100.

The weight percent of component c) is determined by subtracting the weight fraction of component a) soluble in xylene multiplied by the weight percent of component a) from the weight percent of the final product soluble in xylene.

The weight percent of component b) is determined by subtracting the weight percent of component a) and of component c) from 100.

The percent by weight of the alpha-olefin contained in the copolymer of component c) which is soluble in xylene is calculated using the following formula:

$$\text{Alpha-olefin wt. \% in component c)} = \frac{C_F - C_w \cdot Q}{Y}$$

where $C_F$ is the wt. % in alpha-olefin in the soluble xylene in the final product; $C_w$ is the wt. % alpha-olefin in the soluble in xylene of component a); Q is the wt. % soluble in xylene of component a) multiplied by the weight fraction of component a) and divided by the wt. fraction of the final product soluble in xylene; and Y is the wt. % of component c) multiplied by the sum of the wt. % of component b) and component c) and then divided by one hundred.

The weight percent of soluble in xylene at room temperature is determined by dissolving 2.5 g of the polymer in 250 ml of xylene in a vessel equipped with a stirrer which is healed at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Examples illustrative of the thermoplastic olefin polymer of this invention, the physical properties thereof and the method of preparing same are set forth below.

SOLID CATALYST COMPONENT

A) Preparation of MgCl$_2$/Alcohol Adduct

Under an inert atmosphere, 28.4 g anhydrous MgCl$_2$, 49.5 g of an anhydrous ethanol, 100 ml of ROL OB/30 vaseline oil, 100 ml of silicone oil having a viscosity of 350 cs are introduced into a reaction vessel equipped with a stirrer and heated at 120° C. with an oil bath and stirred until the MgCl$_2$ is dissolved. The hot reaction mixture was then transferred under inert atmosphere to a 1500 ml vessel equipped with an Ultra Turrax T-45 N stirrer and a heating jacket and containing 150 ml of vaseline oil and 150 ml of silicone oil. The temperature was maintained at 120° C. with stirring for 3 minutes at 3,000 rpm. The mixture was then discharged into a 2 liter vessel equipped with a stirrer containing 1,000 ml of anhydrous n-heptane cooled at 0° C. with a dry ice/isopar bath and stirred at a tip speed of 6 m/sec for about 20 minutes while maintaining the temperature at 0° C. The adduct particles thus formed were recovered by filtering, were washed 3 times at room temperature with 500 ml aliquots of anhydrous hexane and gradually heated by increasing the temperature from 50° C. to 100° C. under nitrogen for a period of time sufficient to reduce the alcohol content from 3 moles to 1.5 moles per mole of MgCl$_2$. The adduct had a surface area of 9.1 m$^2$/g and a bulk density of 0.564 g/cc.

B) Solid Catalyst Component Preparation

The adduct (25 g) was transferred under nitrogen into a reaction vessel equipped with a stirrer and containing 625 ml of TiCl$_4$ at 0° C. under agitation. It was then heated to 100° C. in 1 hr. When the temperature reached 40° C. diisobutylphthalate was added in an amount such that the molar ratio of Mg to diisobutylphthalate is 8. The contents of the vessel were heated at 100° C. for 2 hours with agitation, the agitation was stopped and the solids were allowed to settle. The hot liquid was removed by siphon. 550 ml of TiCl$_4$ was added to the solids in the vessel and the mixture heated at 120° C. for 1 hr. with agitation. The agitation was stopped and the solids were allowed to settle. The hot liquid was then removed by siphon. The solids were washed 6 times at 60° C. with 200 ml aliquots of anhydrous hexane, and then 3 times at room temperature. The solids, after being vacuum dried, had a porosity of 0.261 cc/g, a surface area of 66.5 m$^2$/g and a bulk density of 0.44 g/cc.

EXAMPLES 1-4

These examples illustrate the thermoplastic olefin polymers of this invention and a method for preparing the polymers.

General Operating Conditions

The preparations for polymerization and the polymerization runs were conducted under nitrogen in a series of reactors with a means for transferring the product produced in the immediately preceding reactor to the next reactor. All temperatures, pressures and concentrations of olefin monomers and hydrogen, when present, were constant unless otherwise indicated. The hydrogen is analyzed continuously in gas phase and fed in order to maintain constant the desired concentration of hydrogen.

In the following examples a mixture of TEAL activator and dicyclohexyldimethoxysilane electron donor in an amount such that the weight ratio of TEAL:silane was 4.0 in examples 1, 2 and 3 and 4.8 in example 4, was contacted with an amount of the solid catalyst component, as described above, such that the molar ratio of TEAL:Ti was 191, 132, 184 and 142 in examples 1, 2, 3 and 4, respectively, in a reactor at 15° C. for about 15 minutes. The catalyst was then transferred to another reactor containing an excess of liquid propylene and polymerized for 3 minutes at 20° C.

In the first stage, the prepolymer was transferred to another reactor for a liquid phase polymerization of the relevant monomer(s) to form a component a). The component a) thus formed was then transferred to another reactor in examples 1, 3 and 4 for a liquid phase polymerization of the relevant monomer(s) to increase the amount of component a) formed in the first polymerization reactor or to prepare a different component a), and to a second stage reactor in the case of example 2 as described below.

In the second stage, the component a) product of the immediately preceding reactor was first transferred into a flash pipe and any unreacted monomers were degassed at essentially atmospheric pressure and then fed to another reactor for a gas phase polymerization of the relevant monomers to form components b) and c). The resultant product was then transferred to another reactor for an additional gas phase polymerization of the relevant monomers in order to increase the amount of components b) and c) in the product.

At the end of the second stage polymerization reaction the powder is discharged into a steaming apparatus and the unreacted monomers and volatiles are removed by treating with steam at 105° C. at atmospheric pressure for about 10 minutes and then dried.

The ingredients and relative operating conditions are set forth in Table IX and the tests results are set forth in Table IB.

TABLE IA

| Examples | 1 | 2 | 3 | 4 |
|---|---|---|---|---|
| First Phase | | | | |
| First reactor | | | | |
| Temperature, °C. | 65 | 65 | 60 | 60 |
| Pressure, atm | 33 | 33 | 33 | 33 |
| Time, min. | 56 | 52 | 50 | 71 |
| $H_2$ in gas phase, ppm | 1800 | 2400 | 3100 | 1400 |
| $C_2$ in gas phase, g/hr | 2400 | 3500 | 2066 | 3800 |
| $C_3$ in liquid phase, Kg/hr | 490 | 540 | 550 | 500 |
| Isotactic index, % wt. | — | 92 | — | — |
| Ethylene, % wt | — | 1.9 | — | — |
| Ethylene in sol. xyl., wt % | — | 7.9 | — | — |
| Second Reactor | | | | |
| Temperature, °C. | 54 | — | 60 | 70 |
| Pressure, atm | 33 | — | 33 | 33 |
| Time, min. | 39 | — | 39 | 49 |
| $H_2$ in gas phase, ppm | 1850 | — | 2896 | 6500 |
| $C_2$ in gas phase, g/hr | 750 | — | 633 | — |
| $C_3$ in liquid phase, Kg/hr | 190 | — | 150 | 195 |
| Isotactic index, % wt. | 91.5 | — | 91 | 92.5 |
| Ethylene, % wt | 2.2 | — | 2.0 | 1.6 |
| Ethylene in sol. xyl., % wt | 8.4 | — | 8.1 | 7.5 |
| Second Phase | | | | |
| Third Reactor | | | | |
| Temperature, °C. | 75 | 75 | 75 | 75 |
| Pressure, atm | 14 | 14 | 14 | 14 |
| Time, min. | 22 | 24 | 22 | 19 |
| $H_2$ in gas phase, % moles | 6.3 | 7.2 | 6.2 | 8.0 |
| $C_2$ in gas phase, | 40.6 | 39.2 | 41 | 36 |

TABLE IA-continued

| Examples | 1 | 2 | 3 | 4 |
|---|---|---|---|---|
| % moles | | | | |
| $C_3$ in gas phase, % moles | 46 | 45.5 | 48.5 | 45 |
| Fourth Reactor | | | | |
| Temperature, °C. | 75 | 75 | 75 | 75 |
| Pressure, atm | 11 | 11 | 11 | 10.7 |
| Time, min. | 27 | 29 | 26 | 23 |
| $H_2$ in gas phase, % moles | 6.2 | 7.3 | 6.2 | 7.0 |
| $C_2$ in gas phase, % moles | 40 | 39.3 | 41 | 39.5 |
| $C_3$ in gas phase, % moles | 48 | 46.2 | 49 | 47 |

| Examples | 1 | 2 | 3 | 4 |
|---|---|---|---|---|
| Final Product | | | | |
| Yield, Kg pol/g cat | 19.3 | 12.2 | 17.5 | 16.5 |
| Component b) & c), % wt | 30.0 | 25.0 | 29.0 | 38.0 |
| Ethylene, % wt | 21.0 | 19.3 | 22.9 | 25.3 |
| Intrinsic viscosity, dl/g | 1.86 | — | 1.60 | — |
| Melt flow index, g/10 min | 10.0 | 16.0 | 20.0 | 11.0 |
| Xylene sol., % wt | 25.5 | 24.2 | 25.6 | 28.2 |
| Component b), % wt | 7.0 | 6.8 | 9.8 | 14.4 |
| Component c), % wt | 23.0 | 18.2 | 19.2 | 23.6 |
| $C_2$ in sol. xyl., % wt | 54.0 | 53.7 | 50.7 | 48.8 |
| $C_2$ in component c), % wt | 64.9 | 68.8 | 64.8 | 57.0 |
| Melting point (DSC), °C. | 151 | 152 | 152 | 154 |
| Flexural modulus, MPa | 560 | 640 | 570 | 560 |
| IZOD impact, −20° C., J/m | 115 | 80 | 75 | 129 |
| Impact failure at −18° C. | ductile | ductile | ductile | ductile |
| Vicat (1 kg), °C. | 118 | 122 | — | 115 |
| Elong. at break, % | >500 | >500 | >500 | >500 |
| Tensile strength, MPa | 19.0 | 17.3 | 15.5 | 16.5 |

Physical blends of a) a propylene homopolymer with (i) an ethylene-propylene rubber or (ii) an ethylene-propylene diene monomer rubber and b) a propylene-ethylene copolymer with (ii) were prepared by mixing the two materials in a Banbury mixer at a temperature of approx. 205° C. until a homogeneous blend was obtain. Such blends are commercially available.

The formulations and the physical properties are set forth in Table II below.

TABLE II

| | Comparative Examples | | |
|---|---|---|---|
| Ingredients | 1 | 2 | 3 |
| Propylene homopolymer[1] | 60 | 60 | — |
| Propylene-ethylene copolymer[2] | — | — | 60 |
| Ethylene propylene rubber[3] | 40 | — | — |
| Ethylene propylene diene monomer (EPDM)[4] | — | 40 | 40 |
| Octadecyl 3,5-di-t-butyl-4-hydroxyhydrocinnamate | 0.1 | 0.1 | 0.1 |
| MFR, dg/min | 7.3 | 3.0 | 3.2 |
| Tensile strength, MPa | 15.3 | 13.0 | 13.5 |
| Elongation, % | 429 | 443 | 618 |
| Flexural modulus, MPa | 670 | 700 | 445 |

[1]MFR of 12 dg/min.
[2]Random copolymer having a MFR of 12 dg/min and aprox. 2.5% ethylene.
[3]77% ethylene, polydispersity 2.8, Mooney Viscosity, 54 ($M_L$ 1 + 4 at 125° C.).
[4]51% ethylene, 2.2% ethylidene norbornene, polydispersity 3.8, Mooney Viscosity, 46 ($M_L$ 1 + 4 at 125° C.).

Given the lower melt flow of the commercially available physical blends set forth in Table II, which typically translates into better physical properties, one would not have expected the thermoplastic olefin polymers of this invention with their higher melt flow rates to have such superior tensile strength, elongation and ductile impact properties when compared on an essentially equivalent stiffness (flexural modulus) basis.

EXAMPLES 5-7

These examples also illustrate the thermoplastic olefin polymers of this invention and another method for preparing the polymers.

General Operating Conditions

The preparations for polymerization and the polymerization runs were conducted under nitrogen in a 22 liter stainless steel autoclave equipped with a helical magnetic stirrer operated at about 90 rpm. All temperatures, pressures and concentrations of olefin monomers and hydrogen, when present, were constant unless otherwise indicated. The hydrogen was analyzed continuously with a process gas chromatograph in gas phase and fed in order to maintain constant the desired concentration of hydrogen.

The polymerization was a batch process conducted in two stages. The first stage comprising the polymerization of the relevant monomer or monomers in the gaseous state and the second stage the copolymerization of ethylene and propylene in gas phase.

In the first stage, the following ingredients in the order in which they are listed were pressure fed into the autoclave at 20° C. over a period of about 10 minutes: about 0.15 g of of the solid catalyst component, as described herein above, a mixture of 75 ml of TEAL activator at 10% concentration in hexane and in the case of examples 5 and 7, cyclohexylmethyldimethoxysilane electron donor in an amount such that the weight ratio of TEAL:silane was 38.7 in example 5 and 6.0 in example 7. The particular monomer or monomers were then fed into the autoclave continuously over the reaction period in an amount sufficient to maintain the desired pressure. The temperature was brought to the desired level in about 10 minutes and maintained at that temperature for the entire polymerization reaction period. After the established reaction time had passed, essentially all of the unreacted monomer(s) was/were eliminated by degassing at 60° C. at essentially atmospheric pressure.

In the second stage, the polymer product a) of the first stage, after having taken a sample for the various analyses, was brought to the established temperature for the second stage. Propylene and ethylene were then fed into the autoclave in the ratio and quantities established in order to obtain the pressure and the gas phase composition desired. During the polymerization the constant pressure was maintained by feeding the propylene and ethylene mixture established. The length of feeding varied according to the catalyst system employed and the amount of components b) and c) desired in the particular thermoplastic olefin polymer product.

At the end of the second stage polymerization reaction the powder is discharged, stabilized with 0.1 wt. % 2,6-ditertiary butyl-para-cresol (BHT) and 0.1 wt. % pentaerythrityl-tetrakis[3-(3,5-di-t-butyl-4-hydroxyphenyl)propionate] and oven dried under a nitrogen stream at 60° C.

The ingredients and relative operating conditions are set forth in Table IIIA and the tests results are set forth in Table IIIB.

TABLE IIIA

| Examples | 5 | 6 | 7 |
|---|---|---|---|
| First Phase | | | |
| TEAL, g | 7.5 | 7.5 | 7.5 |
| TEAL/Donor, mol. | 60 | — | 10 |
| Monomer, type | 1-butene | ethylene | ethylene |
| Temperature, °C. | 60 | 70 | 70 |
| Pressure, atm | 5.4 | 10 | 10 |
| Time, min. | 180 | 230 | 220 |
| $H_2$ in gas phase, % mol. | 0.6 | 32.7 | 31.8 |
| $C_3$ in gas phase, % mol. | — | — | 1.5 |
| Isotactic index, % wt. | 97.7 | 100 | 98.4 |
| Density, g/cc | 0.911 | 0.96 | 0.946 |
| Xylene sol., % wt. | 2.3 | 0.0 | 1.6 |
| Second Phase | | | |
| Temperature, °C. | 60 | 70 | 70 |
| Pressure, atm | 6.0 | 12.0 | 12.0 |
| Time, min. | 90 | 50 | 55 |
| $H_2$ in gas phase. % mol. | 1.8 | 4.2 | 7.6 |
| $C_2$ in gas phase, % mol. | 44.0 | 33.5 | 36.9 |
| $C_3$ in gas phase, % mol. | 56.0 | 66.5 | 63.1 |

TABLE IIIB

| Examples | 5 | 6 | 7 |
|---|---|---|---|
| Final Product | | | |
| Yield, Kg pol/g cat | 8.1 | 3.9 | 3.8 |
| Component b) & c), % wt | 24.2 | 25.4 | 26.0 |
| Intrinsic viscosity, dl/g | 2.75 | 1.56 | 1.81 |
| Melt flow index, "L", g/10 min | 1.3 | 4.5 | 3.0 |
| Xylene sol., % wt | 21.1 | 20.4 | 24.7 |
| Component b), % wt | 4.8 | 5.0 | 2.6 |
| Component c), % wt | 19.4 | 20.4 | 23.4 |
| $C_2$ in sol. xyl., % wt | 50.4 | 55.0 | 54.3 |
| $C_2$ in component c), % wt | 55.0 | 55.0 | 57.0 |
| Melting point (DSC), °C. | 124 | 135 | 132 |
| Flexural modulus, MPa | 170 | 550 | 460 |
| IZOD impact, −20° C., J/m | 60 | 913 | NB* |
| Impact failure at −18° C. | ductile | ductile | ductile |
| Vicat (1 kg), °C. | 107 | 115 | 99 |
| Elong. at break, % | 560 | 790 | 800 |
| Tensile strength, MPa | 13.2 | 17.0 | 13.0 |

*No break.

It is understood that additional monomer(s) may be used in the first stage and/or in the second stage.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A thermoplastic olefin polymer prepared by sequential polymerization in at least two stages comprising:

a) greater than 60 to about 85 parts of a crystalline polymer fraction selected from the group consisting of (i) a copolymer of propylene and at least one alpha-olefin having the formula $H_2C=CHR$, where R is H or a $C_{2-6}$ straight or branched chain alkyl, containing over 85% by weight propylene and having an isotacticity index of greater than 75, (ii) a polybutene-1 having an isotacticity index of greater than 75, (iii) an ethylene homopolymer having a density of 0.95 g/cm$^3$ or greater, or a copolymer of ethylene with a $C_{3-8}$ alpha-olefin having a density of 0.94 g/cm$^3$ or greater, or (iv) mixtures thereof;

b) from about 1 up to less than 15 parts of a semi-crystalline, low density, essentially linear copolymer fraction having a crystallinity of 20 to 60% by differential scanning calorimetry and consisting of propylene and over 90 wt. % of units of the alpha-olefin ethylene or of units consisting substantially of the alpha olefin ethylene and a different alpha-olefin having the formula set forth above in a), which copolymer is insoluble in xylene at room temperature; and c) from about 10 to less than 39 parts of an amorphous copolymer fraction of the alpha-olefin ethylene and propylene containing from about 30 to about 80 weight % ethylene, with or without (i) 1 to 10% of a diene or (ii) about 3 to about 10 % of a different alpha-olefin termonomer having the formula set forth above in a), which amorphous copolymer fraction is soluble in xylene at room temperature, provided that the alpha-olefin(s) used to produce b) and c) are the same, said thermoplastic olefin polymer having a flexural modulus lower than 1000 MPa to 150 MPa, tensile strength greater than 7 MPa, impact strength such that it breaks with a ductile impact failure at $-18°$ C. and an elongation at break over 200%, wherein the total polymerized alpha-olefin monomer content is from 10 to 30% by weight, excluding, if present, the different alpha-olefin termonomer of component c) (ii), and the total of components a), b) and c) is 100 parts.

2. The polymer of claim 1 wherein component a) is (i).

3. The polymer of claim 1 wherein component a) is (ii).

4. The polymer of claim 1 wherein component a) is (iii).

5. The polymer of claim 2 wherein (i) is a copolymer of propylene and ethylene.

6. The polymer of claim 2 wherein 1 (i) has an isotacticity index of greater than 90.

7. The polymer of claim 3 wherein (ii) has an isotacticity index of greater than 85.

8. The polymer of claim 4 wherein (iii) is a copolymer of ethylene with 1 to 10% of the alpha-olefin.

9. The polymer of claim 4 wherein (iii) is a copolymer of ethylene and butene-1.

10. The polymer of claim 4 wherein (iii) is a homopolymer of ethylene.

11. The polymer of claim 1 wherein the flexural modulus is from 150 to 700 MPa, the tensile strength is greater than 10 MPa, the elongation at break is greater than 500%, and the impact strength is such that it breaks with a ductile impact failure at $-29°$ C.

12. The polymer of claim 1 wherein the flexural modulus is from 500 to 700 MPa, the tensile strength is greater than 13 MPa, and the elongation at break is greater than 500%.

13. The polymer of claim 1 wherein the polymer is in the form of spherical particles having an average diameter of 250 to 7000 microns, a flowability of less than 30 seconds and a bulk density (compacted) greater than 0.4 g/cc.

14. The polymer of claim 2 wherein the flexural modulus is from 150 to 700 MPa, the tensile strength is greater than 10 MPa, the elongation at break is greater than 500%, and the impact strength is such that it breaks with a ductile impact failure at $-29°$ C.

15. The polymer of claim 2 wherein the flexural modulus is from 500 to 700 MPa, the tensile strength is greater than 13 MPa, and the elongation at break is greater than 500%.

16. The polymer of claim 2 wherein the polymer is in the form of spherical particles having an average diameter of 250 to 7000 microns, a flowability of less than 30 seconds and a bulk density (compacted) greater than 0.4 g/cc.

* * * * *